(12) United States Patent
Yasuda

(10) Patent No.: US 8,504,199 B1
(45) Date of Patent: Aug. 6, 2013

(54) ROBOT CONTROL SYSTEM

(75) Inventor: Ken'ichi Yasuda, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 516 days.

(21) Appl. No.: 12/941,085

(22) Filed: Nov. 8, 2010

Related U.S. Application Data

(60) Provisional application No. 61/260,408, filed on Nov. 12, 2009.

(51) Int. Cl.
  *B25J 9/16* (2006.01)
  *B25J 9/22* (2006.01)
  *B25J 9/02* (2006.01)
  *B25J 9/18* (2006.01)

(52) U.S. Cl.
  USPC ........... 700/245; 700/250; 700/257; 700/264; 901/2; 901/15

(58) Field of Classification Search
  USPC ................. 700/245–264; 901/2–4, 15–16, 32
  See application file for complete search history.

(56) References Cited

U.S. PATENT DOCUMENTS

| | | | | |
|---|---|---|---|---|
| 5,430,643 | A * | 7/1995 | Seraji ............................ | 700/263 |
| 5,912,540 | A | 6/1999 | Kosaka et al. | |
| 2005/0143860 | A1 * | 6/2005 | Nakajima et al. ............. | 700/245 |
| 2005/0246062 | A1 * | 11/2005 | Keibel ........................... | 700/245 |
| 2011/0093119 | A1 * | 4/2011 | Park et al. ..................... | 700/254 |
| 2011/0153297 | A1 * | 6/2011 | Keibel ............................ | 703/7 |

FOREIGN PATENT DOCUMENTS

| | | |
|---|---|---|
| JP | 60-238904 | 11/1985 |
| JP | 08-300280 | 11/1996 |
| WO | WO 2012143044 A1 * | 10/2012 |

* cited by examiner

*Primary Examiner* — Khoi Tran
*Assistant Examiner* — Dale Moyer
(74) *Attorney, Agent, or Firm* — Ditthavong Mori & Steiner, P.C.

(57) ABSTRACT

A robot control system includes a start position storage that stores a start position or orientation in a manual operation, a redundancy trajectory storage that successively stores a position or orientation of optimized redundancy during the manual operation, and a reverse movement controller which performs movement control for changing the position or orientation of a robot hand, which have been changed by the manual operation, in a reverse direction from the current position or orientation to the start position or orientation. The reverse movement controller also performs movement control for reversely changing the position or orientation of the redundancy by following the position or orientation of the redundancy that have been successively stored in the redundancy trajectory storage.

7 Claims, 5 Drawing Sheets

ROBOT CONTROL SYSTEM

CROSS-REFERENCE TO RELATED APPLICATIONS

The present application claims priority to U.S. Provisional Application No. 61/260,408, which was filed on Nov. 12, 2009. The contents of the application are incorporated herein by reference in their entirety.

BACKGROUND OF THE INVENTION

1. Field of the Invention

The present invention relates to a robot control system for controlling a robot with seven or more joints having redundancy.

2. Description of the Related Art

As described in Japanese Unexamined Patent Application Publication No. 60-238904, a robot control system according to a related art performs a step-back operation to cause a robot to step back from a current position to a taught position. In addition, according to Japanese Unexamined Patent Application Publication No. 8-300280, a movement start position is stored when a jog movement is started, and a robot is caused to return to the stored start position when a return command button is operated.

SUMMARY OF THE INVENTION

According to one aspect of the present invention, a robot control system includes a manual operation unit provided with a manual operation key with which a robot having joints with seven or more degrees of freedom is manually operated; a jog controller that generates a command of a position or orientation of the robot in accordance with the manual operation; a servo controller that controls the robot in accordance with the generated command; a redundancy optimizer that optimizes a position or orientation of a seventh or higher degree of freedom in the manual operation; a start position storage that stores a position or orientation of a robot hand or a joint angle of each axis at the time when the manual operation key is pressed; a redundancy trajectory storage that successively stores a position or angle of redundancy optimized during the manual operation; and a reverse movement controller which, while a reverse-movement operation key provided on the manual operation unit is being pressed, performs movement control for reversely changing the position or orientation of the robot hand from a current position or orientation in a direction toward the position or orientation stored in the start position storage, and performs movement control of the redundancy on the basis of the position or angle of the redundancy stored in the redundancy trajectory storage.

According to another aspect of the present invention, a robot control system includes a manual operation unit provided with a manual operation key with which a robot having joints with seven or more degrees of freedom is manually operated; a jog controller that generates a command of a position or orientation of the robot in accordance with the manual operation; a servo controller that controls the robot in accordance with the generated command; a redundancy optimizer that optimizes a position or orientation of a seventh or higher degree of freedom in the manual operation; a redundancy trajectory storage that successively stores a position or angle of redundancy optimized during the manual operation; and movement-mode switching means that switches a movement mode to a reverse movement control mode. In the reverse movement control mode, during movement control for changing a position or orientation of a robot hand in a specified direction with the manual operation key, the redundancy optimizer performs an optimization calculation for optimizing the position or angle of the redundancy on the basis of the position or angle of the redundancy stored in the redundancy trajectory storage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
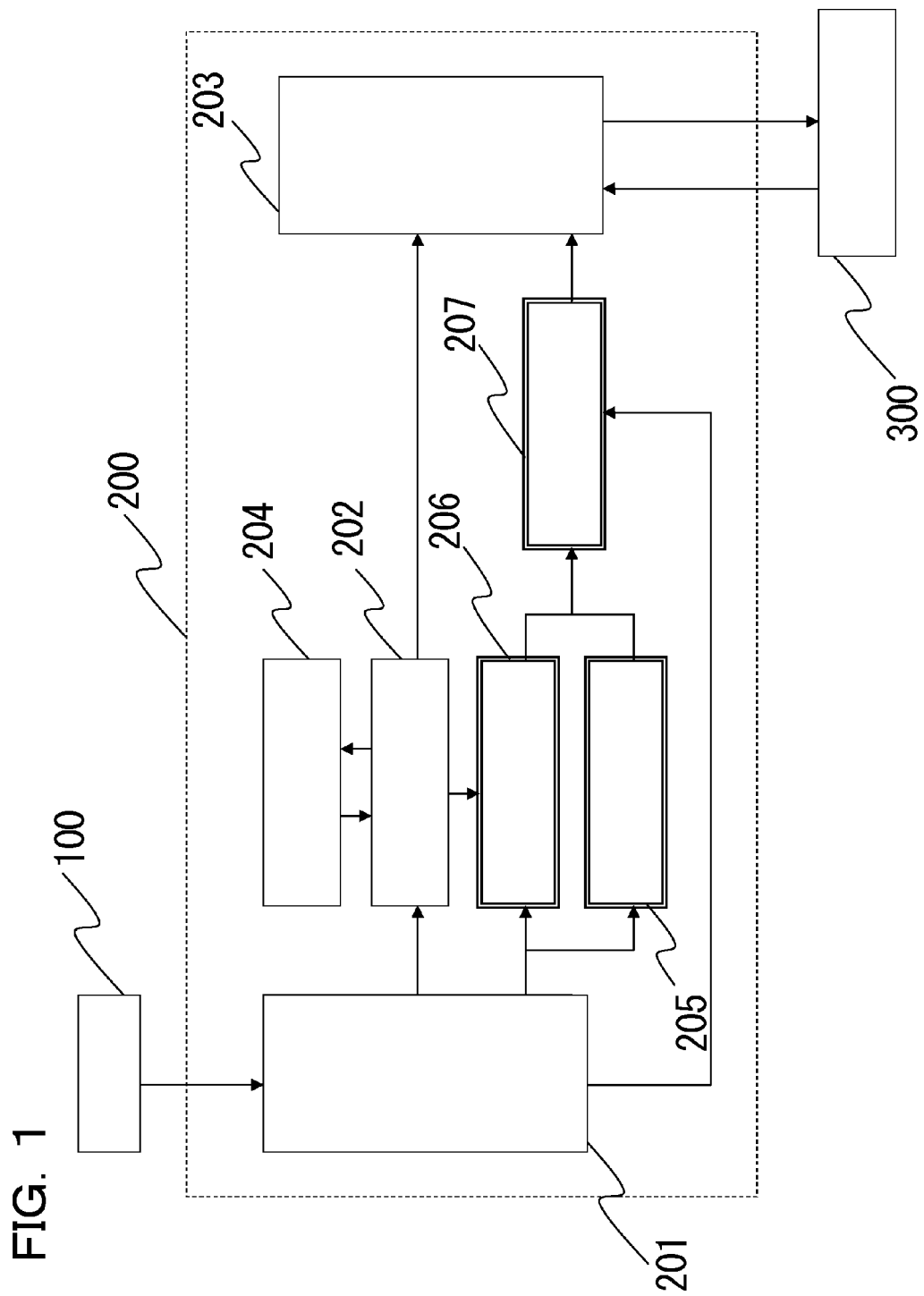
FIG. 1 is a block diagram of a robot control system according to a first embodiment.

Embodiments will now be described with reference to the accompanying drawings, wherein like reference numerals designate corresponding or identical elements throughout the various drawings.

First Embodiment

Figure 2A:
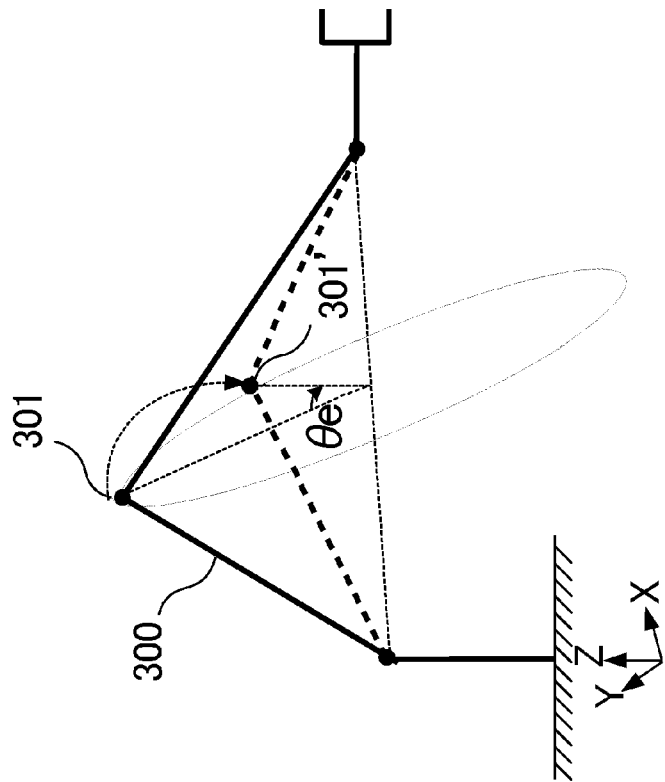
FIG. 2A is a schematic diagram of a seven-degree-of-freedom robot.
Figure 2B:
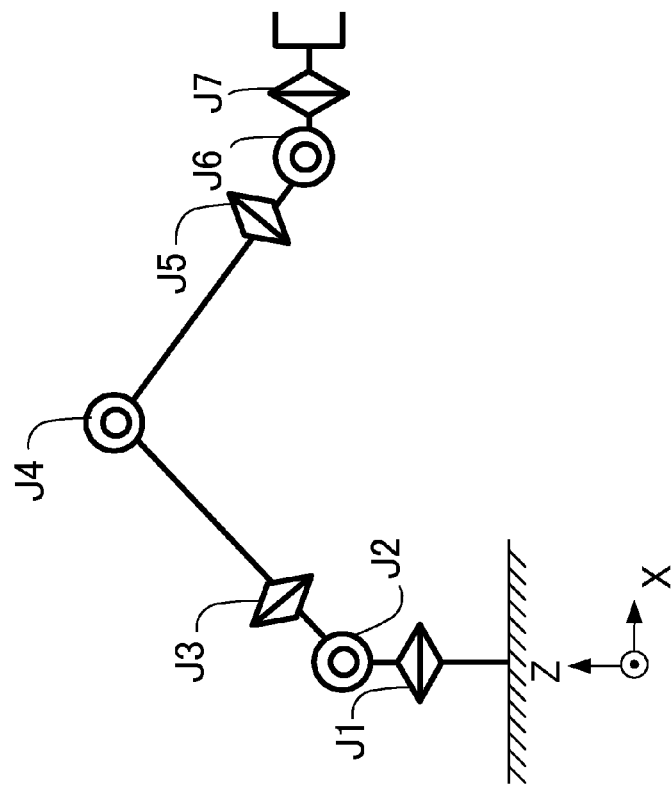
FIG. 2B is a diagram illustrating the movement of an elbow joint of the seven-degree-of-freedom robot.

FIG. 1 illustrates a block diagram of a robot control system according to a first embodiment. Referring to FIG. 1, when a jog operation key (not shown) provided on a manual operation unit 100 is operated, a manual operation processor 201 included in a robot controller 200 transmits a movement direction and a movement speed corresponding to the operation of the key to a jog controller 202. The jog controller 202 generates target position and orientation for each axis of a robot 300, and outputs each joint angle command to a servo controller 203. The servo controller 203 is subjected to position and speed control on the basis of each joint angle command and joint-angle feedbacks from motors (not shown) of the robot 300, and generates a torque command for each axis motor to control a hand of the robot 300. In the case where the robot 300 has redundancy, a redundancy optimizer 204 automatically optimizes the redundancy in accordance with an evaluation function of manipulability and an allowance to a joint angle limit, and changes an elbow angle, a hip angle, etc., to optimum values while maintaining the position and orientation of the hand at the position and orientation corresponding to the manual operation. Here, a robot having seven joints (J1 to J7) as shown in FIG. 2A will be described as an example of the robot 300. In this case, the redundancy is provided such that an elbow position 301 can be rotated without changing the position (X, Y, Z) and the orientation (Tx, Ty, Tz) of the hand, as illustrated in FIG. 2B. This is called an elbow angle (θe).

A process of storing the position and orientation during a movement of the robot hand in a jog operation will now be explained. A start position storage 205 stores a start position P1 (X, Y, Z, Tx, Ty, Tz) of the position and orientation of the robot hand and the elbow angle θe (0) at the time when the jog operation key in the manual operation unit 100 is pressed. Alternatively, joint angles of the joints J1 to J7 may be stored. In addition, the elbow angle θe(i) (i is a sequence number) output from the redundancy optimizer 204 while the hand is being moved by the jog controller 202 is successively stored in a redundancy trajectory storage 206. This process is continued until the jog operation key is released and the robot 300 is stopped at position P2. In this process, in the position (X, Y, Z) or orientation (Tx, Ty, Tz) of the robot hand, data of the position or orientation in the jog movement direction specified by the manual operation unit 100 is stored together with the elbow angle in the redundancy trajectory storage 206.

Next, a process of reversely moving the robot along the trajectory in the jog operation after stopping the robot will be explained. When a reverse-movement operation key (not shown) provided on the manual operation unit 100 is pressed, the manual operation processor 201 transmits a reverse-movement command, which is a command to return to the stored start position P1, to the reverse movement controller 207. Then, when the reverse-movement operation key is released, a reverse-movement stop command is transmitted. In other words, while the reverse-movement operation key is being pressed, the reverse movement controller 207 continuously controls the movement to the start position P1 and outputs a joint angle command for each axis to the servo controller 203. A command of the position and orientation of the robot hand for moving the robot hand to the start position P1 is generated by the same means as that in the jog control. However, a command of the elbow angle is generated in accordance with the reverse movement operation by reading the data of the elbow angle and the position or orientation of the robot hand stored in the redundancy trajectory storage 206.

According to the above-described structure, by operating the reverse-movement operation key, the position and orientation of the robot hand can be reversely changed along the trajectory in the jog operation. In addition, the elbow angle that has been changed by the redundancy optimizer 204 can be reversely changed in accordance with the position and orientation of the robot hand that is being reversely moved at an arbitrary speed.

An example of the elbow angle data stored in the redundancy trajectory storage 206 during the jog operation in the X direction will be described with reference to FIG. 3. The start position stored in the start position storage 205 is P1, and the current position at which the jog operation is stopped is P2. The redundancy trajectory storage 206 stores the X-coordinate position X of the robot hand together with the elbow angle θe. The elbow angle is automatically optimized by the redundancy optimizer 204, and is changed in a complex manner in accordance with an evaluation function to be optimized. However, in the case where the data of the position or orientation of the robot hand in the direction of the jog operation is stored together with the elbow angle as described above, combinations of the elbow angle and the position or orientation of the hand are determined. Accordingly, when the robot hand is reversely moved at an arbitrary speed along the trajectory in the jog operation, the elbow angle corresponding to the position and orientation of the robot hand can be reproduced. Since it is not necessary to store the trajectory of the position and orientation of the robot hand in all of the movable directions thereof, the amount of data to be stored is small.

Figure 3:
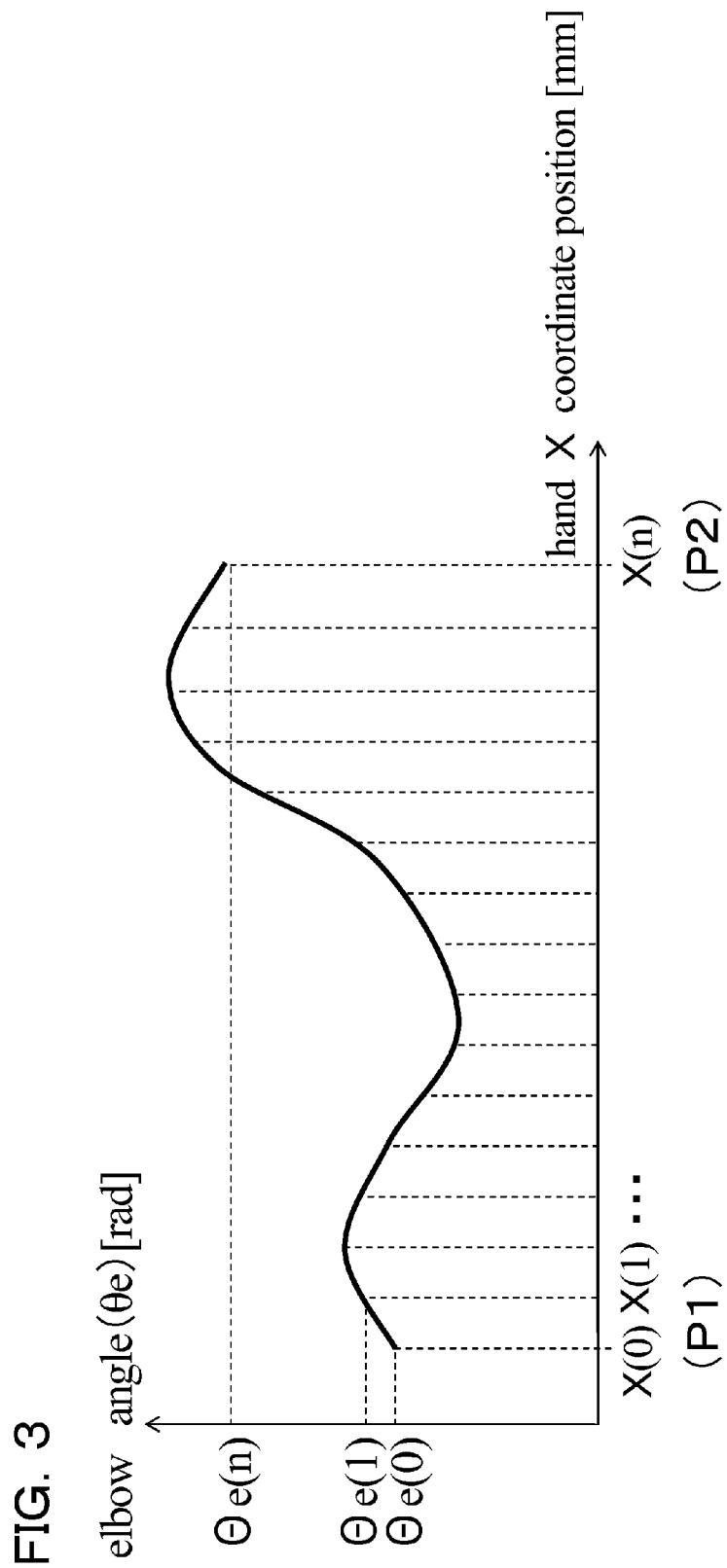
FIG. 3 is a graph illustrating data of redundancy stored in the robot control system.

Although the elbow angle is stored at every predetermined distance along the X-coordinate position of the hand in FIG. 3, the elbow angle may instead be stored at every predetermined time interval. Alternatively, the elbow angle may be stored each time an amount of change in the elbow angle reaches or exceeds a predetermined amount. In such a case, the amount of data may be reduced.

Figure 4:
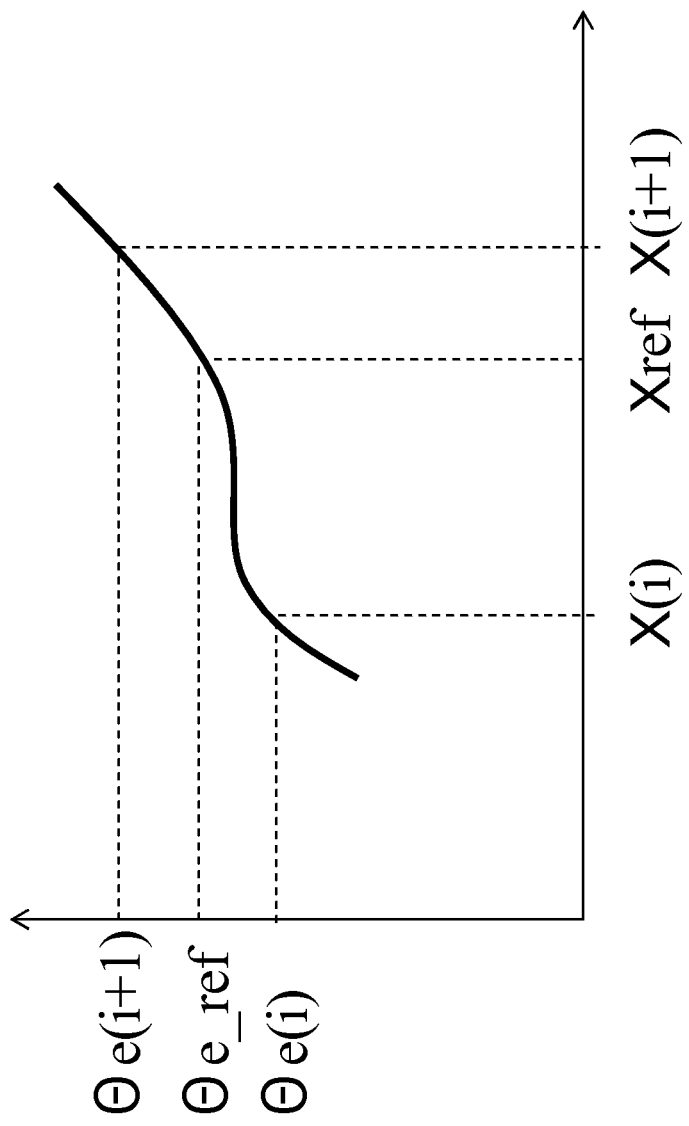
FIG. 4 is a graph illustrating a method for determining an elbow angle command in the robot control system.

A method for determining the elbow angle during the reverse movement along the trajectory in the jog operation will now be described with reference to FIG. 4. It is assumed that an X-coordinate position command for the robot hand that is being reversely moved is Xref. In this case, X-coordinate positions X(i) and X(i+1) closest to Xref are selected from the X-coordinate positions stored in the redundancy trajectory storage 206. Then, an elbow angle command θe_ref is calculated from elbow angles θe(i) and θe(i+1) corresponding to the X-coordinate positions X(i) and X(i+1), respectively, as follows:

$$\theta e\_ref = \frac{\theta e(i+1) - \theta e(i)}{X(i+1) - X(i)} \times (X\_ref - X(i)) + \theta e(i) \quad (1)$$

Second Embodiment

Figure 5:
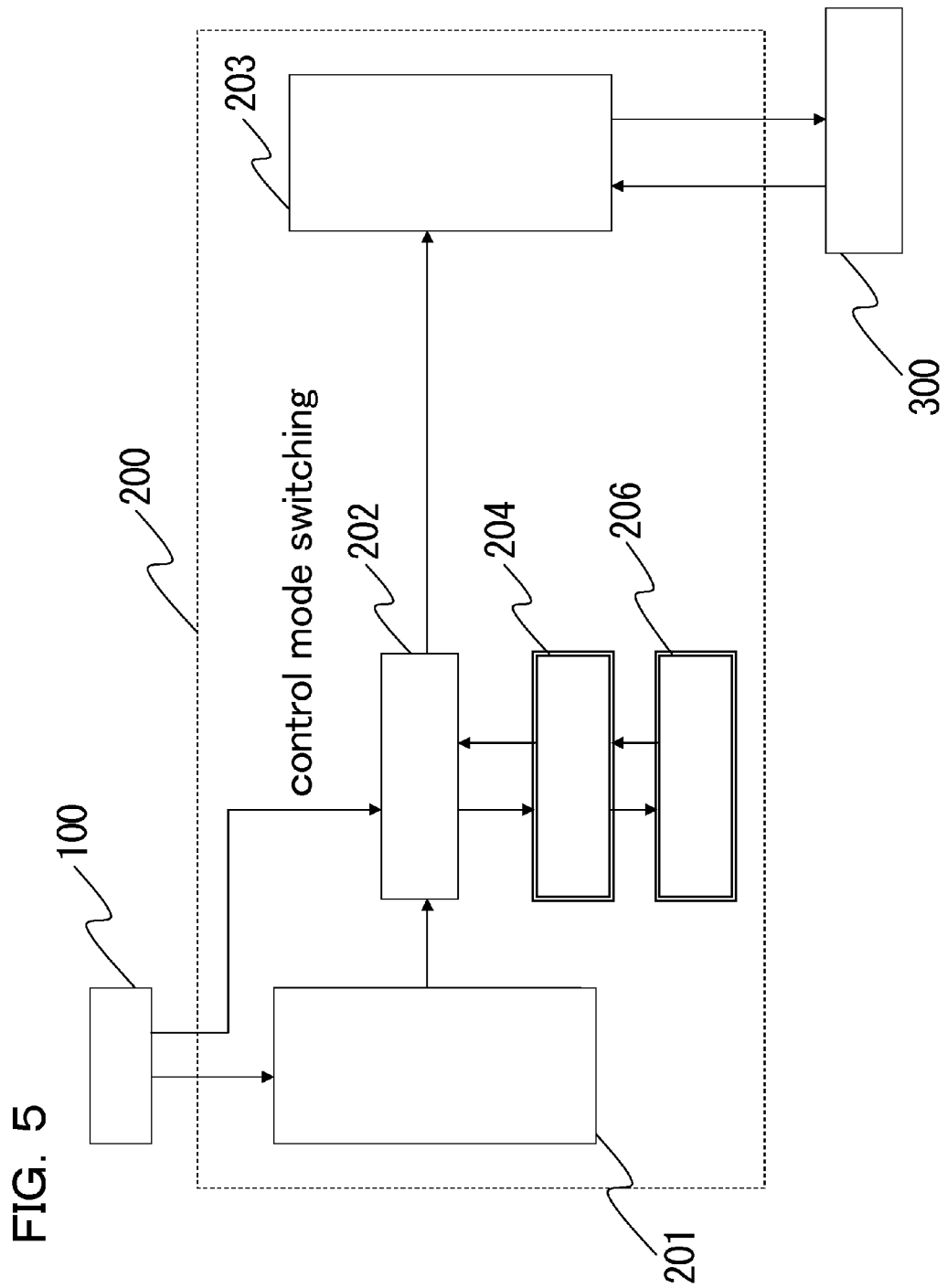
FIG. 5 is a block diagram of a robot control system according to a second embodiment.

FIG. 5 illustrates a block diagram of a robot control system according to a second embodiment. Referring to FIG. 5, when a jog operation key (not shown) provided on a manual operation unit 100 is operated, a manual operation processor 201 included in a robot controller 200 transmits a movement direction and a movement speed corresponding to the operation of the key to a jog controller 202. The jog controller 202 generates target position and orientation for each axis of a robot 300, and outputs each joint angle command to a servo controller 203. The servo controller 203 is subjected to position and speed control on the basis of each joint angle command and joint-angle feedbacks from motors (not shown) of the robot 300, and generates a torque command for each axis motor to control a hand of the robot 300. In the case where the robot 300 has redundancy, a redundancy optimizer 204 automatically optimizes the redundancy in accordance with an evaluation function of manipulability and an allowance to a joint angle limit and changes the redundancy, such as an elbow angle and a hip angle, to optimum values while maintaining the position and orientation of the hand at the position and orientation corresponding to the manual operation.

A process of storing the position and orientation during a movement of the robot hand in a jog operation will now be explained. Here, the elbow angle is considered as an example of redundancy. The elbow angle θe(i) (i is a sequence number) output from the redundancy optimizer 204 while the hand is being moved from the initial position P1 by the jog controller 202 is successively stored in a redundancy trajectory storage 206. This process is continued until the jog operation key is released and the robot 300 is stopped at position P2. In this process, in the position (X, Y, Z) or orientation (Tx, Ty, Tz) of the robot hand, data of the position or orientation in the jog movement direction specified by the manual operation unit 100 is stored together with the elbow angle in the redundancy trajectory storage 206.

Next, a process of reversely moving the robot along the trajectory in the jog operation after stopping the robot will be explained. When a reverse-movement-control-mode switch key (not shown) provided on the manual operation unit 100 is pressed, a movement mode is switched to a reverse movement control mode. Then, when a manual operation key is pressed in a direction (for example, −X direction) opposite to a direction (for example, +X direction) in the above-described operation, the jog controller 202 receives the result of calculation performed by the redundancy optimizer 204 and controls the redundancy. At this time, the redundancy optimizer 204 generates a command of the elbow angle in accordance with the manual reverse movement operation by reading the elbow angle corresponding to the current position or orientation of the hand from the redundancy trajectory storage 206, similar to the first embodiment.

As an example of another operation, it is assumed that the robot hand is moved first in the +X direction and then in the +Y direction, and is to be reversely moved in the −X direction. According to the present embodiment, the position and orientation of the robot including the redundancy can be reversely changed by immediately moving the robot hand in the −X direction without moving the robot hand in the −Y direction. In this case, when the reverse movement control mode is set and a −X operation key is pressed, the redundancy optimizer 204 reads the elbow angle corresponding to the current X position of the hand from the redundancy trajectory storage 206 and successively optimizes the elbow angle within a range around the elbow angle read from the redundancy trajectory storage 206. Accordingly, the elbow angle can be reversely changed to the elbow angle before the movement in the +X direction while performing an operation for preventing the elbow angle from reaching a joint angle limit. More specifically, in the successive optimization calculation performed by the redundancy optimizer 204, the elbow angle to be used as the center of search is calculated from Equation (1) on the basis of the data stored in the redundancy trajectory storage 206. Then, the elbow angle for the next cycle is determined on the basis of the evaluation value for when the elbow angle is changed from the center of search by a certain angle in the positive or negative direction.

Although the elbow angle of a seven-degree-of-freedom robot is described as an example of the redundancy in the above-described embodiments, the redundancy is not limited to this. The redundancy may instead be, for example, a turning angle of a hip or a degree of freedom, such as translation or rotation, of a mobile base on which the robot is mounted. Also in such cases, a reverse movement along the trajectory in the jog operation including the redundancy can be achieved by similar means.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A robot control system comprising:
    a manual operation unit provided with a manual operation key with which a robot having joints with seven or more degrees of freedom is manually operated;
    a jog controller that generates a command of a position or orientation of the robot in accordance with the manual operation;
    a servo controller that controls the robot in accordance with the generated command;
    a redundancy optimizer that optimizes a position or orientation of a seventh or higher degree of freedom in the manual operation;
    a start position storage that stores a position or orientation of a robot hand or a joint angle of each axis at the time when the manual operation key is pressed;
    a redundancy trajectory storage that successively stores a position or angle of redundancy optimized during the manual operation; and
    a reverse movement controller which, while a reverse-movement operation key provided on the manual operation unit is being pressed, performs movement control for reversely changing the position or orientation of the robot hand from a current position or orientation in a direction toward the position or orientation stored in the start position storage, and performs movement control of the redundancy on the basis of the position or angle of the redundancy stored in the redundancy trajectory storage.

2. The robot control system according to claim 1,
    wherein the redundancy trajectory storage stores the position or orientation of the redundancy together with the position or orientation of the robot hand in a direction of operation performed by the manual operation unit.

3. The robot control system according to claim 1,
    wherein the reverse movement controller calculates a target position or angle of the redundancy corresponding to the current position or orientation of the robot hand on the basis of the combination of the position or orientation of the robot hand and the position or angle of the redundancy stored in the redundancy trajectory storage.

4. A robot control system comprising:
    a manual operation unit provided with a manual operation key with which a robot having joints with seven or more degrees of freedom is manually operated;
    a jog controller that generates a command of a position or orientation of the robot in accordance with the manual operation;
    a servo controller that controls the robot in accordance with the generated command;
    a redundancy optimizer that optimizes a position or orientation of a seventh or higher degree of freedom in the manual operation;
    a redundancy trajectory storage that successively stores a position or angle of redundancy optimized during the manual operation; and
    movement-mode switching means that switches a movement mode to a reverse movement control mode,
    wherein, in the reverse movement control mode, during movement control for changing a position or orientation of a robot hand in a specified direction with the manual operation key, the redundancy optimizer performs an optimization calculation for optimizing the position or angle of the redundancy on the basis of the position or angle of the redundancy stored in the redundancy trajectory storage.

5. The robot control system according to claim 4,
    wherein the redundancy trajectory storage stores the position or orientation of the redundancy together with the position or orientation of the robot hand in a direction of operation performed by the manual operation unit.

6. The robot control system according to claim 4, further comprising:
    a reverse movement controller that calculates a target position or angle of the redundancy corresponding to a current position or orientation of the robot hand on the basis of the combination of the position or orientation of the robot hand and the position or angle of the redundancy stored in the redundancy trajectory storage.

7. The robot control system according to claim 4,
    wherein the redundancy optimizer calculates a target position or angle of the redundancy corresponding to a current position or orientation of the robot hand on the basis of the combination of the position or orientation of the robot hand and the position or angle of the redundancy stored in the redundancy trajectory storage, and wherein the redundancy is successively optimized within a range around the target position or target angle of the redundancy.

* * * * *